(12) United States Patent
Páez et al.

(10) Patent No.: US 12,511,364 B2
(45) Date of Patent: Dec. 30, 2025

(54) SYSTEM AND METHOD FOR PROVIDING SECURE, VERIFIED, AND AUTHENTICATED IDENTIFICATION FOR AN INDIVIDUAL

(71) Applicants: José Francisco Bustamante Páez, Mexico City (MX); Ramón Mondragón Sotelo, Mexico City (MX)

(72) Inventors: José Francisco Bustamante Páez, Mexico City (MX); Ramón Mondragón Sotelo, Mexico City (MX)

( * ) Notice: Subject to any disclaimer, the term of this patent is extended or adjusted under 35 U.S.C. 154(b) by 274 days.

(21) Appl. No.: 17/692,908

(22) Filed: Mar. 11, 2022

(65) Prior Publication Data
US 2023/0289423 A1    Sep. 14, 2023

(51) Int. Cl.
| | |
|---|---|
| *G06F 21/34* | (2013.01) |
| *G06F 21/32* | (2013.01) |
| *H04L 9/08* | (2006.01) |
| *H04L 9/32* | (2006.01) |
| *G06F 21/10* | (2013.01) |

(52) U.S. Cl.
CPC ............. *G06F 21/34* (2013.01); *G06F 21/32* (2013.01); *H04L 9/0819* (2013.01); *H04L 9/3263* (2013.01); *G06F 21/1084* (2023.08); *G06F 2221/2117* (2013.01)

(58) Field of Classification Search
CPC ...... G06F 21/34; G06F 21/32; G06F 21/1084; G06F 2221/2117; H04L 9/0819; H04L 9/3263; H04L 9/321; H04L 9/50
See application file for complete search history.

(56) References Cited

U.S. PATENT DOCUMENTS

| | | | |
|---|---|---|---|
| 2019/0034928 A1* | 1/2019 | Triplett | G06F 9/541 |
| 2020/0374124 A1* | 11/2020 | Bahloul | H04L 9/3231 |
| 2022/0122059 A1* | 4/2022 | Bressler, Jr. | G06Q 20/28 |
| 2022/0132310 A1* | 4/2022 | Tsuoka | H04W 8/20 |
| 2022/0366158 A1* | 11/2022 | Mitake | G06K 7/1408 |

OTHER PUBLICATIONS

Shanika Wickramasinghe, "SDK vs API: What's The Difference?", [retrieved on Apr. 10, 2024], from the Internet <URL: https://www.bmc.com/blogs/sdk-vs-api/> (Year: 2022).*

* cited by examiner

*Primary Examiner* — Sangseok Park
(74) *Attorney, Agent, or Firm* — The Rapacke Law Group, P.A.

(57) ABSTRACT

A system for providing secure, verified, and authenticated identification for an individual is disclosed, including a cyphered byte array for storing identifying information associated with an individual. An ID card includes at least one code associated with the individual's associated identifying information. The ID card is scanned by a computing device associated with an authority or a third-party via an API web server interface to permit the authority or the third-party to verify the identity of the individual.

20 Claims, 5 Drawing Sheets

SYSTEM AND METHOD FOR PROVIDING SECURE, VERIFIED, AND AUTHENTICATED IDENTIFICATION FOR AN INDIVIDUAL

TECHNICAL FIELD

The embodiments generally relate to computerized systems for providing personal information security and privacy and more specification relate to systems and methods for providing an individual with an identity that is authenticated and verifiable.

BACKGROUND

Privacy and the exchange of personal information has become increasingly important as the use of the Internet and other digital services have become more popular. In order to use many services which may or not be digital, individuals must divulge personal information which can put the individual at risk. Often, the individual's personal data is shared to multiple parties which offers various opportunities for their personal data to be insecure.

Without access to a means for receiving identity verification (e.g., a government ID), individuals may not be able to access certain services. For example, the individual may be unable to execute certain transactions, have access to legal services, or purchase certain goods and services. This is common in vulnerable and marginalized groups who may be denied access to a legally recognized form of identity.

SUMMARY OF THE INVENTION

This summary is provided to introduce a variety of concepts in a simplified form that is disclosed further in the detailed description of the embodiments. This summary is not intended to identify key or essential inventive concepts of the claimed subject matter, nor is it intended for determining the scope of the claimed subject matter.

The embodiments provided herein relate to a system for providing secure, verified, and authenticated identification for an individual, including a database for storing identifying information associated with an individual. An ID card includes at least one code associated with the individual's associated identifying information. The ID card is scanned by a computing device associated with an authority or a third-party via an API web server interface and offline verification to permit the authority or the third-party to verify the identity of the individual.

The embodiments increase confidentiality while providing an authentic means for transmitting an individual's personal information which is protected from falsification, alteration, and identity theft. The system utilizes a digital signature algorithm operating in communication with a symmetric and asymmetric encryption process. The individual's information is stored which allows for the documents to be securely validated by third-parties. The system allows for an individual to access and obtain a verified identification who may not be able to otherwise.

In one aspect, the at least one code is a QR code scannable via the computing device.

In one aspect, the system utilizes a byte array as the at least one code. In another aspect, the system may utilize a near-frequency communication (NFC) chip.

In one aspect, the identifying information includes biometric data.

In one aspect, the identifying information includes a portrait.

In one aspect, the identifying information includes biographical data.

In one aspect, the identifying information includes fingerprint biometric data.

In one aspect, the identifying information is encrypted via a private key and decryption process guard.

In one aspect, the system includes an enrollment layer, a generation layer, and a validation layer. The enrollment layer permits the individual to submit the identifying information. The generation layer receives the identifying information from the enrollment layer to generate the at least one code. The validation layer permits the authority or the third-party to validate the at least one code in reference to the individual's identifying information.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
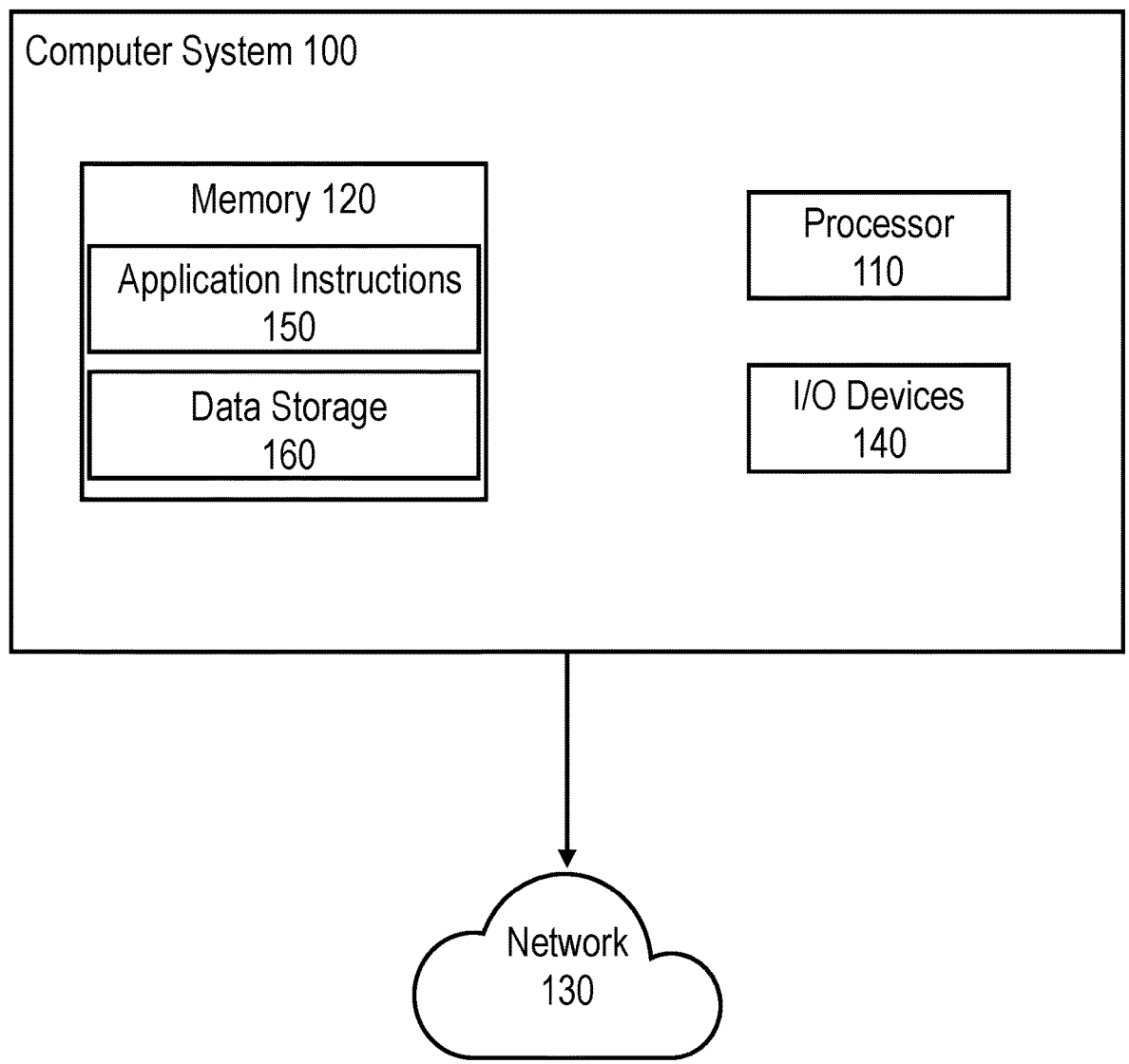
FIG. 1 illustrates a block diagram of the network infrastructure, according to some embodiments.

The specific details of the single embodiment or variety of embodiments described herein are to the described system and methods of use. Any specific details of the embodiments are used for demonstration purposes only, and no unnecessary limitations or inferences are to be understood thereon.

Before describing in detail exemplary embodiments, it is noted that the embodiments reside primarily in combinations of components and procedures related to the system. Accordingly, the system components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments provided herein relate to a system and method for providing a secure identity to protect the individual's personal information. The embodiments increase confidentiality while providing an authentic means for transmitting an individual's personal information which is protected from falsification, alteration, and identity theft. The system utilizes a digital signature algorithm operating in communication with a symmetric and asymmetric encryption process. The individual's information is stored which allows for the documents to be securely validated by third-parties. The system allows for an individual to access and obtain a verified identification who may not be able to otherwise.

The embodiments allow for authorities, individuals, and interested third-parties to securely exchange an individual's identifying information to permit those individuals to exercise their civil rights and obligations, as well as engage in transactions and services which may require valid identification.

As used herein, the term "authority" and "authorities" may relate to government organizations, non-profit organizations (NPO's), private sectors groups, businesses, regulatory agencies, etc. which require validated identification to engage in certain services, exchange of goods, or procedures. Operating with an authority may include an enrollment process to ensure infrastructure is attained and managed. The authorities may utilize a computing device operating a computer system described herein to interact with the system and verify the identity of the individual.

As used herein, the term "individual(s)" are those who are associated with their own identifying information stored in the system. The individual may not need a computing device or other form of technology to access, share, or otherwise utilize their identifying information. In some embodiments, the individual may be provided with an ID card which includes a QR code, byte array, or similar code (hereinafter referred to simply as "code" or "the code" which can be scanned by the authority and/or third-party. The ID card and code is associated with their identifying information stored in the system.

As used herein, the term "third-parties" may include any group, entity, or interested third-party which verify the identity of the individual. For example, the third-party may be a financial institution, bank, service provider, and the like which may require a validated identification in exchange for providing a service, to exchange a good, or to initiate a procedure. The third-parties may utilize a computing device operating a computer system described herein to interact with the system and verify the identity of the individual.

As used herein, the term "identifying information" may comprise various information submitted by a user including their name, contact information, address, biometric information, imagery, and the like.

The embodiments provided herein provide various technical improvements including the ability to provide an offline and non-network connected solution to individuals seeking to utilize secure and verifiable identification. Validation of the individuals identifying information may be performed by third-parties and/or authorities using a computing device (e.g., a smartphone). Distributed processing of data is performed because validation performed within the same device concurrence on centralized servers is avoided. The system is also performed as a multi-process system and is scalable such that the system may support any number of transactions in a period of time.

In some embodiments, the system includes at least a processor and a memory therein, in which the system includes means for operating a cryptographic interface and displaying a GUI to a user prompting the individual to create a new data privacy profile and for an authority and a third-party to verify the individual's data. The system receives configuration input from the individual at the GUI to generate the data privacy profile for the user; receiving account input at the GUI from the user specifying a plurality of web-accessible accounts; retrieving profile data from the plurality of web-accessible accounts by authenticating with the plurality of web-accessible accounts and populating the retrieved profile data into the user's newly generated data privacy profile stored at the host organization.

In certain embodiments, the Application Programming Interface (API) of the query interface provides an API model through which programmers, developers, and administrators may interact with the systems of the generation and validation layers, as the needs and particular requirements of the API dictates. In some embodiments, a software development kit (SDK) may be used as a programming tool.

A blockchain is a continuously growing list of records, grouped in blocks, which are linked together and secured using cryptography. This system may only be utilized in both the generation and validation layer. Each block typically contains a hash pointer as a link to a previous block, a timestamp and transaction data. By design, blockchains are inherently resistant to modification of the data. A blockchain system essentially is an open, distributed ledger that records transactions between two parties in an efficient and verifiable manner, which is also immutable and permanent. A distributed ledger (also called a shared or common ledger or referred to as distributed ledger technology (DLT)) is a consensus of replicated, shared, and synchronized digital data geographically spread across multiple nodes. The nodes may be located in different sites, countries, institutions, user communities, customer organizations, host organizations, hosted computing environments, or application servers. There is no central administrator or centralized data storage.

FIG. 1 illustrates a computer system 100, which may be utilized to execute the processes described herein. The computer system 100 is comprised of a standalone computer or mobile computing device, a mainframe computer system, a workstation, a network computer, a desktop computer, a laptop, or the like. The computer system 100 includes one or more processors 110 coupled to a memory 120 via an input/output (I/O) interface. Computer system 100 may further include a network interface to communicate with the network 130. One or more input/output (I/O) devices 140, such as video device(s) (e.g., a camera), audio device(s), and display(s) are in operable communication with the computer system 100. In some embodiments, similar I/O devices 140 may be separate from computer system 100 and may interact with one or more nodes of the computer system 100 through a wired or wireless connection, such as over a network interface.

Processors 110 suitable for the execution of a computer program include both general and special purpose microprocessors and any one or more processors of any digital computing device. The processor 110 will receive instructions and data from a read-only memory or a random-access memory or both. The essential elements of a computing device are a processor for performing actions in accordance with instructions and one or more memory devices for storing instructions and data. Generally, a computing device will also include, or be operatively coupled to receive data from or transfer data to, or both, one or more mass storage devices for storing data, e.g., magnetic, magneto-optical disks, or optical disks; however, a computing device need not have such devices. Moreover, a computing device can be embedded in another device, e.g., a mobile telephone, a personal digital assistant (PDA), a mobile tablet device, a mobile audio or video player, a game console, a Global Positioning System (GPS) receiver, or a portable storage device (e.g., a universal serial bus (USB) flash drive).

A network interface may be configured to allow data to be exchanged between the computer system 100 and other devices attached to a network 130, such as other computer systems, or between nodes of the computer system 100. In various embodiments, the network interface may support communication via wired or wireless general data networks, such as any suitable type of Ethernet network, for example, via telecommunications/telephony networks such as analog voice networks or digital fiber communications networks, via storage area networks such as Fiber Channel SANs, or via any other suitable type of network and/or protocol.

The memory 120 may include application instructions 150, configured to implement certain embodiments described herein, and a database 160, comprising various data accessible by the application instructions 150. In one embodiment, the application instructions 150 may include software elements corresponding to one or more of the various embodiments described herein. For example, application instructions 150 may be implemented in various embodiments using any desired programming language, scripting language, or combination of programming languages and/or scripting languages (e.g., C, C++, C#, JAVA®, JAVASCRIPT®, PERL®, etc.).

The steps and actions of the computer system 100 described in connection with the embodiments disclosed herein may be embodied directly in hardware, in a software module executed by a processor, or in a combination of the two. A software module may reside in RAM, flash memory, ROM memory, EPROM memory, EEPROM memory, registers, a hard disk, a removable disk, a CD-ROM, or any other form of storage medium known in the art. An exemplary storage medium may be coupled to the processor 110 such that the processor 110 can read information from, and write information to, the storage medium. In the alternative, the storage medium may be integrated into the processor 110. Further, in some embodiments, the processor 110 and the storage medium may reside in an Application Specific Integrated Circuit (ASIC). In the alternative, the processor and the storage medium may reside as discrete components in a computing device. Additionally, in some embodiments, the events or actions of a method or algorithm may reside as one or any combination or set of codes and instructions on a machine-readable medium or computer-readable medium, which may be incorporated into a computer program product.

Also, any connection may be associated with a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. "Disk" and "disc," as used herein, include compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

In some embodiments, the system is world-wide-web (www) based, and the network server is a web server delivering HTML, XML, etc., web pages to the computing devices. In other embodiments, a client-server architecture may be implemented, in which a network server executes enterprise and custom software, exchanging data with custom client applications running on the computing device.

Figure 2:
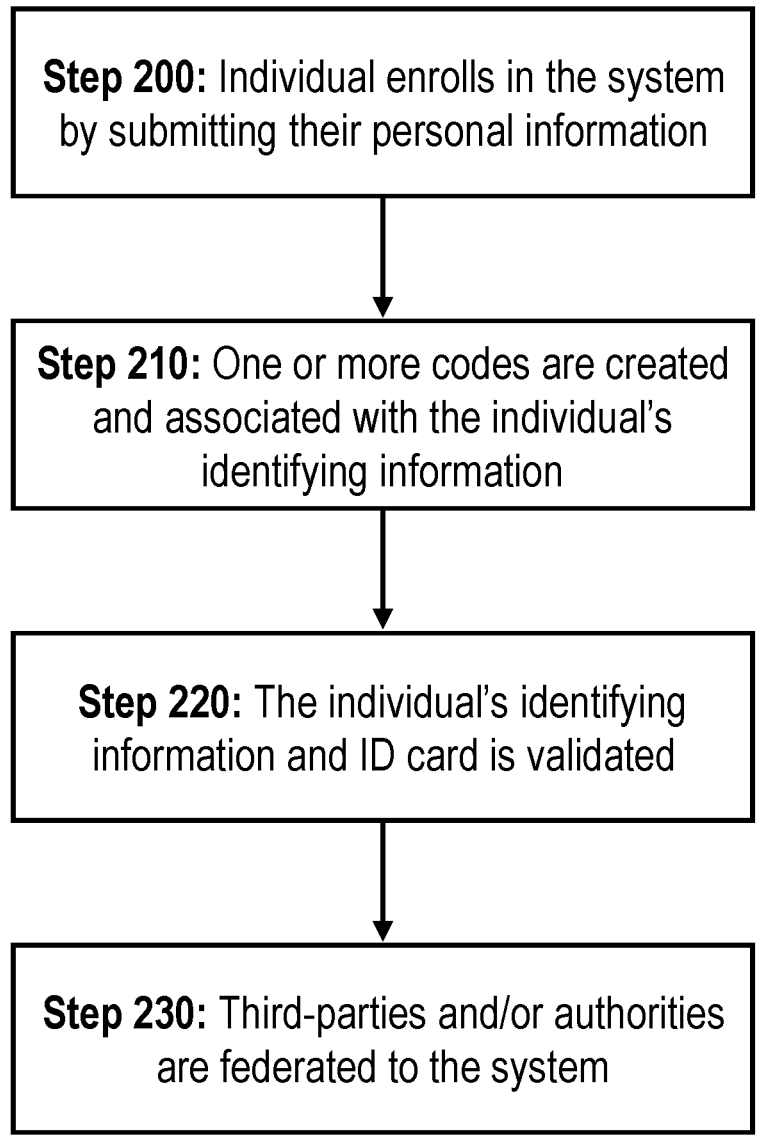
FIG. 2 illustrates a flowchart of a method for integrating an individual's identifying information into the system and permitting their identifying information and associated ID card to be utilized to validate the individual's identity, according to some embodiments.

FIG. 2 illustrates a flowchart of a method for integrating an individual's identifying information into the system and permitting their identifying information and associated ID card to be utilized. In step 200, the individual enrolls in the system by submitting their personal information. The individual's identifying information (e.g., their name, biometric data, personal data, etc.) is then stored in database which may include a symmetric and asymmetric encryption process. In step 210, one or more codes (e.g., QR codes) are created and are associated to the individual's identifying information. The system encrypts the individual's identifying information within the database to ensure their identifying information is secure. In some embodiments, a pair of QR codes is associated with the individual's identifying information. The individual's identifying information is stored using a double encryption process involving public or asymmetric key algorithms. Further the system may utilize digital signature algorithms to protect the individual's personal information in a symmetric and asymmetric encryption process. In step 220, the individual's identifying information and ID card corresponding thereto is validated by a third-part and/or authority to permit the individual to utilize their ID card to access a good, service, or process. In step 230, third-parties and/or authorities are federated to the system to allow the third-party and/or authority to access a plurality of individual's identifying information.

Figure 3:
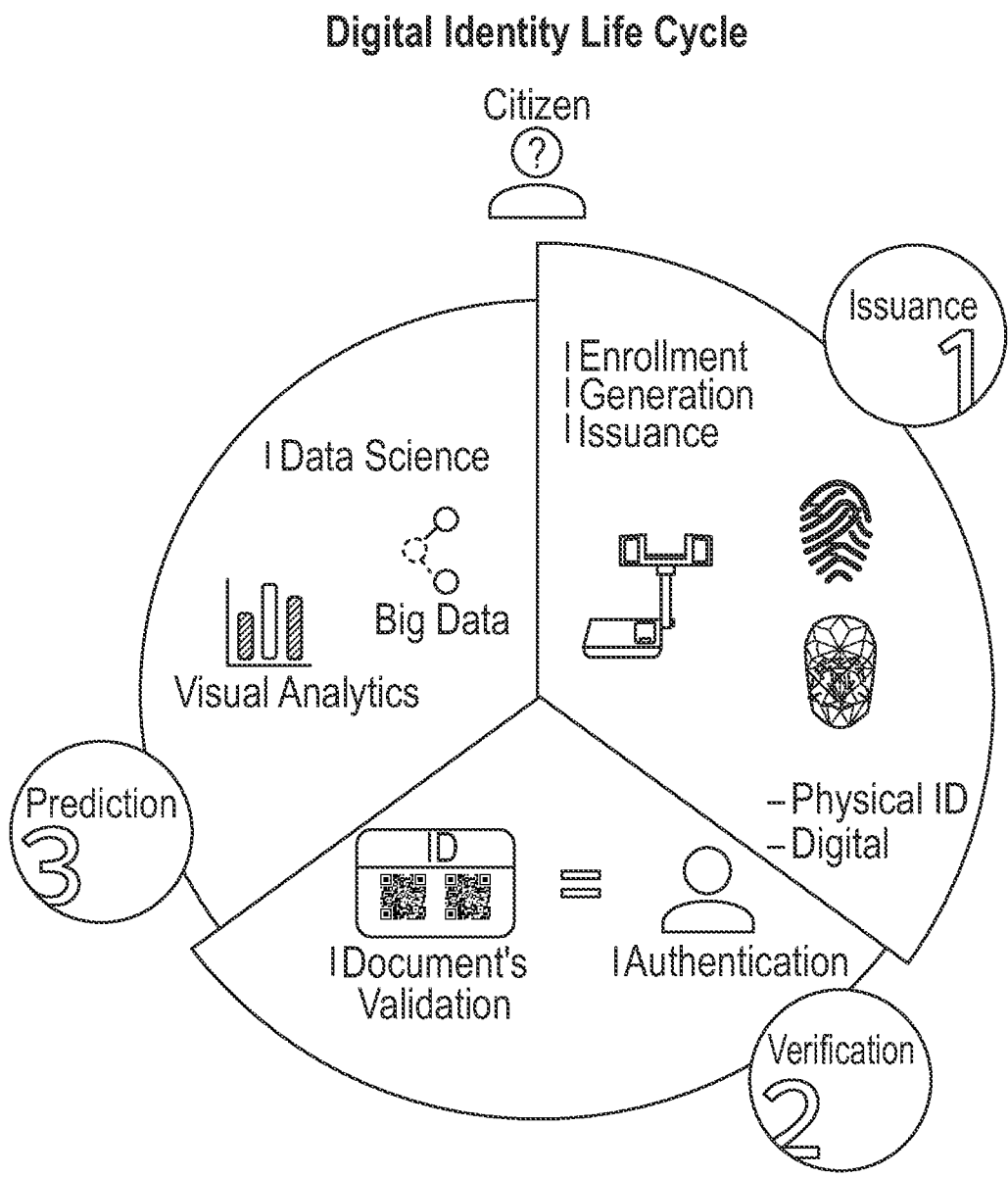
FIG. 3 illustrates a schematic of the life cycle of an individual's identifying information, according to some embodiments.

FIG. 3 illustrates a schematic of the life cycle of an individual's identifying information as utilized by the system. The individual's identifying information is submitted to the system to permit a code to be generated and issued via an ID card including one or more codes printed thereon. The ID card may then be issued to the individual to permit the individual to utilize the ID card as a validated form of identification. The ID card is associated with a digitized identification which can be accessed by authorities and/or third-parties. The digitized identification is associated with the individual's identifying information. The individuals identifying information can then be validated and authenticated which can be used for data analytics, data science processes, etc.

Figure 4A:
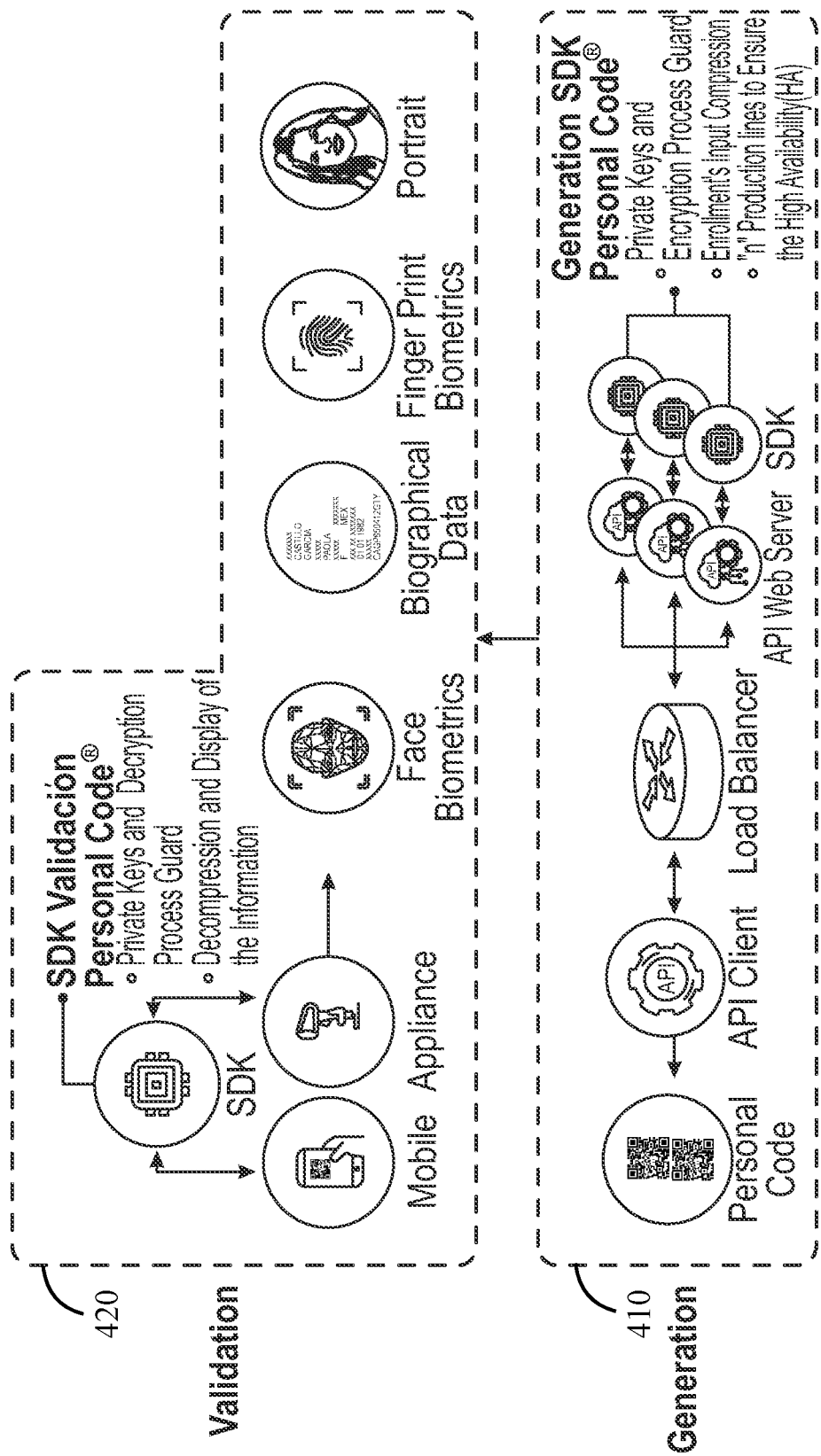
FIG. 4A illustrates a schematic of the security architecture including the enrollment layer and the generation layer, according to some embodiments.
Figure 4B:
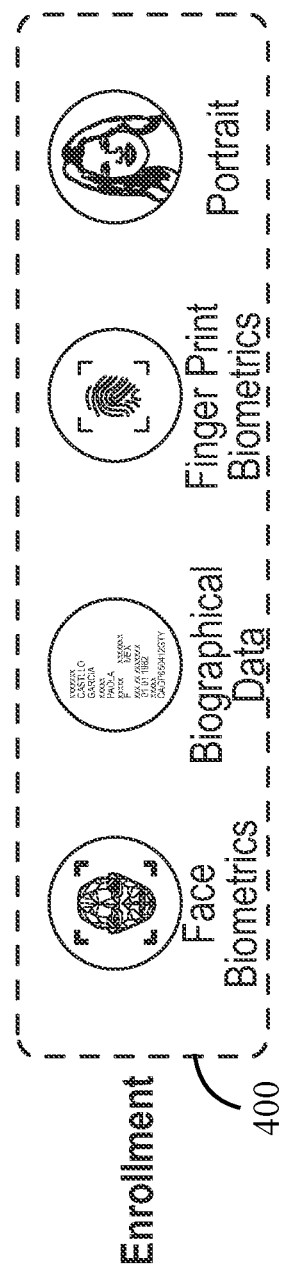
FIG. 4B illustrates a schematic of the security architecture including the validation layer, according to some embodiments.

FIG. 4A and FIG. 4B illustrates a schematic of the security architecture which includes an enrollment layer 400, a generation layer 410, and a validation layer 420. The individuals identifying information is gathered which includes their face biometrics, biographical data, finger print biometrics, portrait, etc. This identifying information is transmitted to the personal code generation layer 410 which associated a private key and encryption process guard, enrollment input compression of the identifying information, and "n" production lines to ensure sufficiently high availability. The personal code is received from the load balancer via an API client. The personal code may be transmitted to an application program interface (API) web server and software development kit (SDK). The personal code is decompressed via the SDK to allow an authority and/or third-party using a computing device to verify and authenticate the user's identifying information.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for any one of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A system for providing secure, verified, and authenticated identification for an individual, the system comprising:
   a cyphered byte array database for storing identifying information associated with an individual, wherein the database is accessible only via a private key and decryption guard;
   an ID card comprising at least one code associated with the individual's associated identifying information; and
   a computing device associated with a third-party configured to scan the machine-readable code via an API web server interface and retrieve the identifying information from the cyphered byte array database to verify the identity of the individual;
   wherein the cyphered byte array database is implemented on a distributed ledger blockchain comprising cryptographically linked blocks that store cyphered byte arrays of the identifying information, the private key being held by the individual, and the decryption guard enforcing asymmetric cryptographic access so that verification is performed without exposing plaintext identifying information to the third-party, and wherein the at least one code comprises a QR code and/or NFC payload that encodes a reference to the cyphered byte array and a nonce enabling offline or online validation.

2. The system of claim 1, wherein the identifying information includes biometric data.

3. The system of claim 2, wherein the identifying information includes a portrait.

4. The system of claim 3, wherein the identifying information includes biographical data.

5. The system of claim 4, wherein the identifying information includes fingerprint biometric data.

6. The system of claim 1, wherein the identifying information is encrypted via a private key and decryption process guard.

7. A system for providing secure, verified, and authenticated identification for an individual, the system comprising:
   a cyphered byte array database for storing identifying information associated with an individual, wherein the database is accessible only via a private key and decryption guard; an ID card comprising at least one code associated with the individual's associated identifying information;
   a software development kit in operable communication with an API web server to permit the authority or third-party to interact with the at least one code; and
   a computing device associated with a third-party configured to scan the machine-readable code via an API web server interface and retrieve the identifying information from the cyphered byte array database to verify the identity of the individual;
   wherein the software development kit exposes a RESTful validation interface that, upon scanning the at least one code, performs signature verification against the cyphered byte array stored on a blockchain and returns a verification result without transmitting plaintext identifying information to the third-party.

8. The system of claim 7, wherein the at least one code is a QR code scannable via the computing device.

9. The system of claim 7, wherein the identifying information includes biometric data.

10. The system of claim 9, wherein the identifying information includes a portrait.

11. The system of claim 10, wherein the identifying information includes biographical data.

12. The system of claim 11, wherein the identifying information includes fingerprint biometric data.

13. The system of claim 12, wherein the identifying information is encrypted via a private key and decryption process guard.

14. The system of claim 7, further comprising an enrollment layer, a generation layer, and a validation layer.

15. The system of claim 14, wherein the enrollment layer permits the individual to submit the identifying information.

16. The system of claim 15, wherein the generation layer receives the identifying information from the enrollment layer to generate the at least one code.

17. The system of claim 16, wherein the validation layer permits the authority or the third-party to validate the at least one code in reference to the individual's identifying information.

18. A method for providing secure, verified, and authenticated identification for an individual, the system comprising:
   providing, via an individual, identifying information to a cyphered byte array database configured to store the identifying information associated with the individual wherein the database is accessible only via a private key and decryption guard;
   generating one or more codes and applying the one or more codes to an ID card;
   associating the one or more codes with the individuals identifying information;
   submitting, via the individual, the ID card to an authority or a third-party; and
   validating, via a software development kit, the one or more codes in reference to the individuals identifying information via a computing device associated with a third-party by scanning the machine-readable code via an API web server interface and retrieving the identifying information from the cyphered byte array database to verify the identity of the individual;
   wherein storing the cyphered byte array comprises committing the identifying information as a cyphered byte array to a blockchain, and wherein validating comprises using the software development kit to verify a signature against the blockchain-stored cyphered byte array and to output a verification result without transmitting plaintext identifying information to the third-party, the one or more codes comprising a QR code and/or NFC payload for offline or online validation.

19. The method of claim 18, wherein the at least one code is a QR code scannable via the computing device.

20. The method of claim 19, wherein the identifying information comprises at least one of the following: biometric data, a portrait, biographical data, and fingerprint biometric data.

* * * * *